United States Patent
Bauer et al.

(10) Patent No.: US 7,946,131 B2
(45) Date of Patent: May 24, 2011

(54) METHOD FOR PRODUCING REACTIVE RAW MATERIAL FOR MANUFACTURE OF GLASS SUITABLE FIBERIZATION

(75) Inventors: Jon Frederick Bauer, Castle Rock, CO (US); Susan McMillin Gee, Littleton, CO (US)

(73) Assignee: Johns Manville, Denver, CO (US)

( * ) Notice: Subject to any disclaimer, the term of this patent is extended or adjusted under 35 U.S.C. 154(b) by 280 days.

(21) Appl. No.: 11/787,634

(22) Filed: Apr. 17, 2007

(65) Prior Publication Data

US 2007/0251275 A1    Nov. 1, 2007

Related U.S. Application Data

(63) Continuation-in-part of application No. 11/451,812, filed on Jun. 13, 2006, which is a continuation-in-part of application No. 11/350,964, filed on Mar. 23, 2006.

(51) Int. Cl.
| | |
|---|---|
| *C03B 1/00* | (2006.01) |
| *C03B 3/00* | (2006.01) |
| *C03C 6/00* | (2006.01) |
| *C03C 6/02* | (2006.01) |
| *C03C 6/10* | (2006.01) |
| *C03C 6/08* | (2006.01) |
| *C03C 6/06* | (2006.01) |
| *C03C 6/04* | (2006.01) |

(52) U.S. Cl. .......... 65/136.1; 65/135.9; 501/27; 501/28; 501/29; 501/30; 501/31

(58) Field of Classification Search .............. 501/27–31; 65/134.1, 136.1, 135.9
See application file for complete search history.

(56) References Cited

U.S. PATENT DOCUMENTS

| | | | | |
|---|---|---|---|---|
| 4,233,051 | A | * | 11/1980 | Eastes .............................. 65/482 |
| 4,238,217 | A | | 12/1980 | Stepanek et al. |
| 4,350,512 | A | * | 9/1982 | Krumwiede ...................... 65/27 |
| 4,519,814 | A | * | 5/1985 | Demarest, Jr. .................... 65/27 |
| 4,539,030 | A | | 9/1985 | Demarest, Jr. et al. |
| 4,576,644 | A | | 3/1986 | Goldmann |

(Continued)

FOREIGN PATENT DOCUMENTS

EP    1373140 B1    4/2005

(Continued)

OTHER PUBLICATIONS

Drummond, III, "65$^{th}$ Conference on Glass Problems", A collection of Papers Presented at the 65$^{th}$ Conference on Glass Problems, The Ohio State University, Columbus, Ohio, Oct. 19-20, 2004, Published by The American Ceramic Society, www.ceramics.org<http://www.ceramics.org>; 103-111.

*Primary Examiner* — Jerry Lorengo
*Assistant Examiner* — Noah S Wiese
(74) *Attorney, Agent, or Firm* — Robert D. Touslee

(57) ABSTRACT

The subject invention is directed to a method for producing a raw material or materials that can be used by themselves or in combination with other ingredients to make glass of high quality at high efficiencies and short production times. The raw materials are capable of high reactivity in a glass melting furnace and therefore will allow glass to be produced either at lower temperatures or shorter residence times at the same temperatures as compared with known methods.

22 Claims, 3 Drawing Sheets

U.S. PATENT DOCUMENTS

| | | | |
|---|---|---|---|
| 4,920,080 A * | 4/1990 | Demarest, Jr. ................ 501/31 |
| 6,211,103 B1 | 4/2001 | Tomaino et al. |
| 6,271,159 B1 | 8/2001 | Fairchild et al. |
| 6,287,378 B1 | 9/2001 | Fairchild et al. |
| 6,287,997 B1 | 9/2001 | Fairchild et al. |
| 6,336,346 B2 | 1/2002 | Tomaino et al. |
| 6,358,870 B1 * | 3/2002 | Szczesniewski et al. ....... 501/27 |
| 6,420,289 B1 | 7/2002 | Tomaino et al. |
| 6,524,703 B1 * | 2/2003 | Court ........................... 428/402 |
| 2004/0204304 A1 * | 10/2004 | Hockman ....................... 501/27 |

FOREIGN PATENT DOCUMENTS

| | | |
|---|---|---|
| EP | 1547982 A1 | 6/2005 |
| WO | WO 99/33765 | 7/1999 |
| WO | WO 02/100791 | 12/2002 |
| WO | WO 02/100793 | 12/2002 |
| WO | WO 03/074434 | 9/2003 |

\* cited by examiner

PRE-REACTION OF LIMESTONE AND LIMESTONE PLUS QUARTZ USING E GLASS FURNACE EXHAUST GASES

US 7,946,131 B2

METHOD FOR PRODUCING REACTIVE RAW MATERIAL FOR MANUFACTURE OF GLASS SUITABLE FIBERIZATION

CROSS-REFERENCE TO RELATED APPLICATIONS

This application is a continuation-in-part of U.S. application Ser. No. 11/451,812, filed Jun. 13, 2006, which is a continuation-in-part of U.S. application Ser. No. 11/350,964, filed Mar. 23, 2006, incorporated herein by reference.

TECHNICAL FIELD

The invention relates to a method for producing a pre-reacted feedstock for use in the manufacture of glass fibers. The method allows for the subsequent production of high-quality glass using considerably less energy than is used with known methods.

BACKGROUND OF THE INVENTION

Conventional melting of E glass used to make textile and chopped textile glass fiber employs limestone ($CaCO_3$) and quartz sand ($SiO_2$) as raw ingredients. In the glass melting furnace, limestone will first decompose to form lime (CaO) at about 900° C. This initial limestone decomposition consumes a significant amount of energy. The lime then reacts with the sand to form calcium silicates—the principal one of which is calcium metasilicate ($CaSiO_3$) in the crystal form of wollastonite. In addition to calcium silicates, the reaction between lime and sand may also produce various calcium magnesium silicates, calcium aluminum silicates or calcium borates. As temperatures increase down the melting furnace, or with long residence times, these calcium silicates react further with early-formed liquid (melt) to form calcium-rich melts. These calcium-rich melts eventually become incorporated into a homogenous melt which ultimately becomes E glass.

As discussed above, limestone breaks down to form lime in the glass melting furnace. This endothermic reaction consumes significant amounts of heat which would be otherwise available for maintaining melt temperatures for refining and homogenization of the glass.

Melting of E glass also produces a vapor phase which consists of volatile alkali, sulfur, and boron-bearing components of the original glass batch together with carbon dioxide ($CO_2$), carbon monoxide (CO), and water. This hot gas phase is a very good reactive medium for promoting "pre-reaction" between limestone and quartz sand, wherein the limestone breaks down into lime.

It would be desirable to pre-react the raw ingredients, wherein the limestone breaks down into lime, before the ingredients enter the glass melting furnace. It would also be desirable to provide a convenient and cost-effective method of using or disposing of the hot gas exhaust phase that exits the glass melting furnace.

BRIEF SUMMARY OF THE INVENTION

The present invention is directed to a system and method which produces a raw material or materials that can be used by themselves or in combination with other ingredients to make glass of high quality at high efficiencies and short production times. These raw materials are capable of high reactivity in a glass melting furnace and therefore will allow the glass to be produced either at lower temperatures or shorter residence times at the same temperatures as compared with current conventional technology. This provides cost savings compared with existing methods either through energy savings or economy of scale, respectively.

More specifically, the method allows production of high quality glass that is suitable for fiberization at high production rates with reduced tendency for filament breakout as compared with current or conventional technology. This method thereby enables the production of such glass without adverse consequences downstream that can result in net efficiency losses and higher operating costs. As a result, energy is used more effectively and less scrap product is produced.

In this method, high-temperature reactive gas streams, such as those generated in furnace exhaust, are brought into contact with selected raw materials or combinations of raw materials in a manner that allows chemical reactions to occur between the individual materials and also between these materials and specific components of the gas itself. These "pre-reactions" produce new raw materials that are significantly more reactive than the original ingredients and thereby will melt out faster when delivered to the main glass melting furnace. Calcination is another chemical reaction that may be accomplished using this process. The reactive gas stream provides both the heat necessary to drive the chemical reactions and key catalytic and fluxing components that improve reaction kinetics. In the case that the reactive gas stream is generated by glass melting furnace exhaust, this method also provides a convenient way to recover waste heat as well as some gaseous material lost from the initial batch.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The invention relates to an improvement in the process used to manufacture glass. More specifically, the invention relates to a method for producing a pre-reacted feedstock for use in the manufacture of glass fibers. The method allows for the production of high-quality glass using considerably less energy than is used with known methods.

Figure 1:
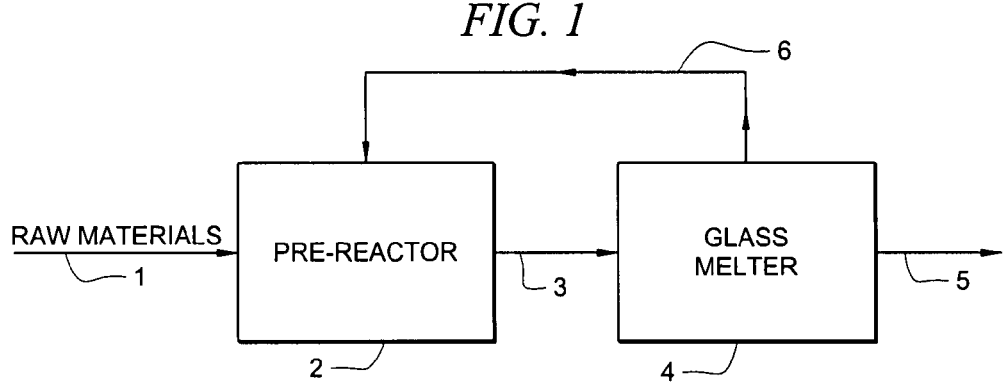
FIG. 1 is a schematic showing one embodiment of the invention, in which an exhaust stream from a glass melting furnace is passed over the raw ingredients used in glass production.

Referring to FIG. 1, a simplified schematic is shown of one embodiment of the current invention. In contrast to known methods, in which raw materials are fed directly into a glass melting furnace, the current invention utilizes a pre-reaction process. In the pre-reaction process, the raw materials are combined with a high temperature reactive gas stream. For example, in the embodiment shown in FIG. 1, the raw materials 1 are combined with an exhaust stream 6 produced in the glass melting furnace 4 during glass melting. The raw materials may comprise limestone and quartz sand. The furnace exhaust stream shown in FIG. 1 typically comprises volatile alkali, sulfur, and boron-bearing components of the original glass batch together with carbon dioxide, carbon dioxide and water, which are the by-products of combustion from air-fired or oxyfuel burners. This hot gas phase is an effective reactive medium for promoting "pre-reaction" between limestone and quartz sand.

In one embodiment, the pre-reaction described above generally involves reacting limestone and quartz sand to form lime. The lime then reacts with the sand to form calcium silicates. The principal calcium silicate is wollastonite, the crystal form of calcium metasilicate. The calcium silicates are essentially an intermediate product in the overall glass making operation. In the absence of a pre-reaction, this intermediate product would be produced anyways in the glass melting furnace. However, a substantial amount of energy is required to produce the calcium silicates in the glass melting furnace. Thus, pre-reacting the initial feedstock before it enters the glass melting furnace saves a significant amount of energy in the melting process.

In the embodiment shown in FIG. 1, the pre-reacted feedstock 3 then enters the glass melting furnace 4, where the calcium silicates react with early-formed liquid to form calcium-rich melts that become incorporated into a homogeneous melt which ultimately becomes E glass. The melt 5 exits the glass melting furnace for further processing. The exhaust stream 6, as shown in this example, exits the glass melting furnace and is recycled back to contact the initial raw materials 1 to form the pre-reacted feedstock.

FIG. 1 serves as an example of one method for producing the pre-reacted feedstock. Gas streams other than the glass melting furnace exhaust stream may also be used to react with the raw materials to form the pre-reacted feedstock. One of ordinary skill in the art would easily recognize the required composition and temperature of a gas stream to effectively pre-react with raw materials to form the pre-reacted feedstock. In some examples, the total alkali content in the reactive gas is between about 0.0001% and about 2% by weight. In additional and alternate examples, the sulfur species content in the reactive gas is between about 0.001% and about 2% by weight. In additional and alternate examples, the boron species content in the reactive gas is between about 0.01% and about 2% by weight.

Calcium metasilicate (wollastonite) is produced commercially for applications other than glass manufacture. For example, "Synopal" is a synthetic wollastonite made in Denmark for use in road surfacing and as whitening additives to tiles and other construction materials. The production method involves firing calcium carbonate and quartz sand in rotary kilns to temperatures in excess of 1500° C. in the presence of steam. High temperatures are required because, at lower temperatures, the reaction is not thermodynamically favored and the reaction kinetics are not fast enough to make the conversion economical.

Another pre-reacted feed stock which can be produced by the method of the invention is anhydrous aluminum silicates such as metakaolin. In this embodiment, the high temperature exhaust gases are used to calcine naturally occurring clays (e.g. kaolin) and other aluminum silicates to remove substantially all of the water present yielding an anhydrous aluminum silicate.

Figure 2:
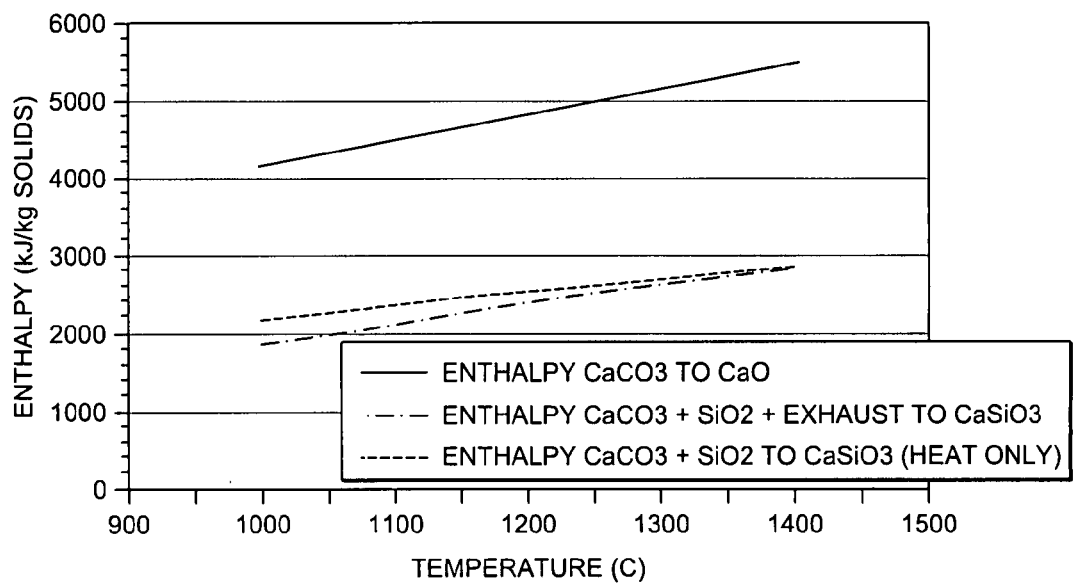
FIG. 2 is a plot of energies required to (a) calcine limestone to form quicklime, (b) calcine and react limestone and quartz to form calcium metasilicate, and (c) form wollastonite using waste heat only and no reactive gaseous species.

Referring now to FIG. 2, the red curve illustrates calculated energy required to calcine limestone to form quicklime. The blue curve shows the energy required to calcine and react limestone and quartz to form wollastonite. The green curve shows the energy required to form wollastonite from the raw materials using waste heat only and no reactive gas species. As the graph illustrates, reactive gases containing water, alkali, borate and sulfur species, such as those found in furnace exhaust, provide a fluxing effect at lower temperatures, allowing for over a 17% energy savings versus direct thermal conversion at 1000° C. This would not be possible for commercial production of wollastonite as in the Synopal case described above, because exhaust gases would introduce small amounts of chemical contaminants and potentially discolor the wollastonite formed. However, this is not a problem for the process described here as such contaminants are actual glass batch components and will be recycled back into the furnace with the calcium metasilicate. Further, under these conditions the reaction requires only about half the energy needed to produce quicklime from limestone. This is largely because of the significant exothermic reaction that occurs when wollastonite crystallizes. Thus, for waste heat utilization in glass manufacture, production of wollastonite is far more favorable than production of quicklime.

Figure 3:
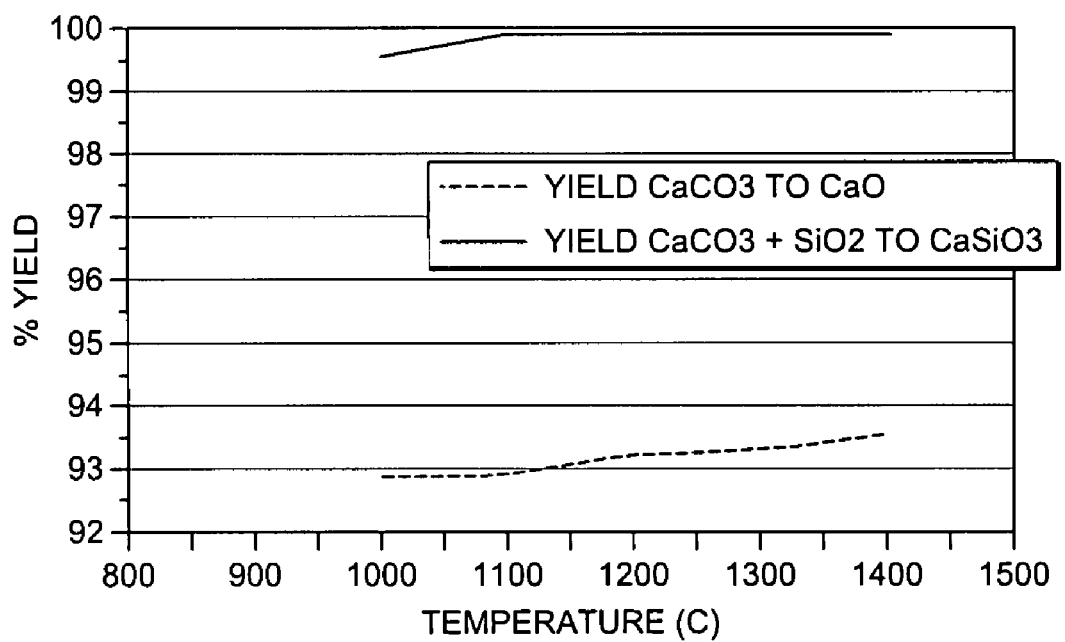
FIG. 3 is a plot of thermodynamically-predicted yields for both wollastonite and quicklime production using furnace exhaust gas streams.

FIG. 3 is a complementary graphic to FIG. 2. It illustrates the thermodynamically-predicted yields for both wollastonite and quicklime production using furnace exhaust gas streams. The graph clearly shows that conversion to wollastonite is nearly 100% at temperatures above about 1125° C. Correspondingly, limestone to quicklime results in yields on the order of only about 93% at the same temperature.

While thermodynamic predictions provide good indications of favorable reactions to produce calcium metasilicate in particular, basic time-temperature studies are required to prove kinetic feasibility. The was accomplished using very simple experiments in which limestone and quartz were premixed and placed into a fused silica crucible and heated to the desired temperature for a given period of time.

Figure 4:
FIG. 4 is a photograph of a mixed batch of quartz and limestone after being heated to 1000° C. for four hours.
Figure 5:
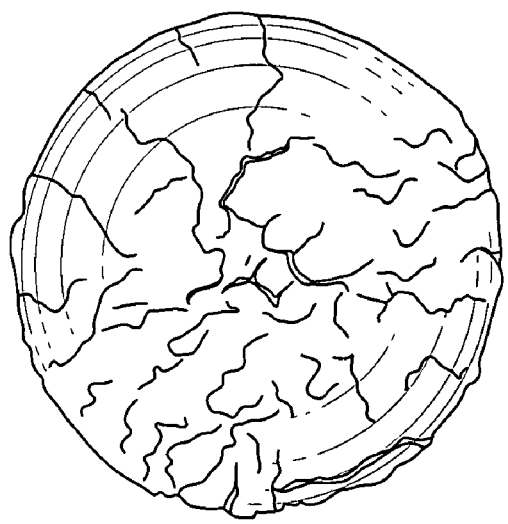
FIG. 5 is a photograph of a mixed batch of quartz and limestone after being heated to 1000° C. and adding small amounts of sodium borate.

As an example, FIGS. 2 and 3 predict that wollastonite can be produced from limestone and quartz sand at a temperature of 1000° C. with a theoretical yield of 99.5%. At this temperature, the reaction requires less than 2000 kj/kg of material and as such would be easily within the output range of most commercial E glass exhaust streams. However, these figures do not show whether the conversion may be severely ratelimited. To determine this, a mixed batch of quartz and limestone was prepared and heated to 1000° C. for four hours. The contents were then removed from the crucible, examined microscopically, and analyzed by x-ray diffraction to determine the nature and amounts of crystalline phases present. FIG. 4 illustrates the result of this experiment. A companion sample was also made to which was added small amounts of sodium borate, a major component of electrostatic precipitator dust collected from an E glass melting furnace exhaust stream. This simulated the condensed phase of the exhaust stream—rich in alkali and boron, as described above. The amount of alkali borate was chosen to represent the amount that would be produced by the melting of the mass of limestone and quartz in the crucible. A similar heat treatment and analysis was performed on this batch sample. FIG. 5 illustrates the result of this experiment.

In FIG. 4, the batch has remained as a uniform powder—optical and x-ray diffraction analysis show that no reaction has occurred between the limestone and quartz alone. Only lime from the limestone decomposition reaction plus quartz was found in the crucible. However, as seen in FIG. 5, the batch containing the simulated exhaust dust shows clear evidence of some reaction. Here, x-ray diffraction and optical analyses indicated that reaction between limestone or lime and quartz had occurred. Approximately 50% of the initial quartz had reacted to form calcium metasilicate and at least two calcium orthosilicate phases. With addition of water—for example, from oxyfuel combustion—and fluidization via rotary kiln or fluidized bed, conversion to wollastonite and other pre-reacted calcium silicated will proceed fairly rapidly even at temperatures as low as 1000° C. Thus, FIGS. 4 and 5 demonstrate that the reaction to form calcium metasilicate occurs much more readily with heat and in the presence of a glass melting furnace exhaust stream than it does with heat alone.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later-to-be-developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of producing a reactive feedstock for use in making glass, comprising the steps of:
    combining raw materials in a pre-reactor in the presence of heat; and
    exposing the combined raw materials to a reactive gas stream such that chemical reactions occur in the pre-reactor to produce said reactive feedstock wherein said reactive feedstock comprises calcium silicates produced in said exposing step,
    wherein the reactive gas stream is directed from a glass melting furnace to the pre-reactor
    wherein the reactive gas stream comprises carbon dioxide and has a total alkali metal content between about 0.0001% and about 2% by weight.

2. The method of claim 1, wherein said raw materials are selected from the group consisting of limestone, quartz sand, clays and mixtures thereof.

3. The method of claim 1 wherein said raw material is kaolin.

4. The method of claim 1, wherein the temperature of said chemical reactions is between about 1000° C. and about 1500° C.

5. The method of claim 1, wherein said reactive feedstock comprises calcium silicates.

6. The method of claim 1, wherein said reactive feedstock comprises calcium magnesium silicates.

7. The method of claim 1, wherein said reactive feedstock comprises calcium aluminum silicates.

8. The method of claim 1, wherein said reactive feedstock comprises calcium borates.

9. The method of claim 1 wherein said reactive feedstock comprises anhydrous aluminum silicate.

10. The method of claim 1, wherein said reactive gas stream is an exhaust stream from a glass melting furnace.

11. The method of claim 1, wherein said reactive gas stream contains alkali oxides, hydroxides, borates and sulfates.

12. The method of claim 1, wherein said reactive gas stream comprises sulfur species.

13. The method of claim 1, wherein said reactive gas stream comprises boron species.

14. The method of claim 2, wherein the temperature of said chemical reactions is between about 1000° and about 1500° C.

15. The method of claim 5, wherein the calcium silicates are selected from the group consisting of wollastonite, calcium orthosilicates, and combinations thereof.

16. The method of claim 6, wherein the calcium magnesium silicates are selected from the group consisting of diopside, monticellite, akermanite, merwinite, and combinations thereof.

17. The method of claim 7, wherein the calcium aluminum silicates are selected from the group consisting of anorthite, gehlenite, and combinations thereof.

18. The method of claim 8, wherein the calcium borates are selected from the group consisting of calcium metaborate, calcium tetraborate, and combinations thereof.

19. The method of claim 9 wherein the anhydrous aluminum silicate is metakaolin.

20. The method of claim 10, wherein the total alkali metal content in the reactive gas is between about 0.1% and about 1.2% by weight.

21. The method of claim 11, wherein the sulfur species content in the reactive gas is between about 0.001% and about 2% by weight.

22. The method of claim 13, wherein the boron species content in the reactive gas is between about 0.01% and about 2% by weight.

* * * * *